United States Patent [19]

Hegeler

[11] Patent Number: 4,633,247

[45] Date of Patent: Dec. 30, 1986

[54] REMOTE CONTROL SYSTEM FOR SELECTIVELY ACTIVATING AND INACTIVATING EQUIPMENT

[75] Inventor: Wilhelm Hegeler, Bad Salzdetfurth, Fed. Rep. of Germany

[73] Assignee: Blaupunkt-Werke GmbH, Hildesheim, Fed. Rep. of Germany

[21] Appl. No.: 770,696

[22] Filed: Aug. 29, 1985

[30] Foreign Application Priority Data

Feb. 29, 1984 [DE] Fed. Rep. of Germany ....... 3407389

[51] Int. Cl.$^4$ .......................... H04Q 7/00; H04Q 9/14; G06F 11/00

[52] U.S. Cl. .......................... 340/825.69; 340/825.52; 340/825.68

[58] Field of Search ...................... 340/825.69, 825.52, 340/825.06, 825.68; 371/2, 53, 70

[56] References Cited

U.S. PATENT DOCUMENTS 4,166,272 8/1979 Deck .................................... 371/70

4,368,534 1/1983 Sibley .................................... 371/53

4,554,541 11/1985 Bielkevicius et al. .......... 340/825.68

*Primary Examiner*—Donald J. Yusko

*Attorney, Agent, or Firm*—Frishauf, Holtz, Goodman & Woodward

[57] ABSTRACT

Sixteen bit messages for selectively controlling receivers either to switch on an apparatus or to switch that apparatus off are transmitted on a format in which sixteen zeros are first transmitted, then a Willard sequence, then a control command, and then sixteen ones. The control command contains, in order of transmission, seven check bits, a control bit, seven address bits and a parity bit. The check bits are obtained by Nordstrom-Robinson coding from the eight data bits which consist of the seven address bits and a control bit, with cyclical rotation of the address bits but non-cyclical treatment of the control bit for deriving the seven check bits, with the result that, because the check bits and the control bit are received first, only three eight bit registers, each used twice first with the check bits as content and then with the address bits and the parity bit as content, are necessary for decoding at the receivers. The check bit comparison detects whether an on command or an off command is still possible and in one of those cases, treats the check bits as reversed in accord with the Nordstrom-Robinson coding, by the sign of the control bit.

8 Claims, 6 Drawing Figures

```
0 0 0 0 0 0 0 0 0 0 0 0 0 0 0 0
0 0 0 0 0 1 0 1 1 1 0 0 1 1 1 1
X X X X X X X X X X X X X X X X
1 1 1 1 1 1 1 1 1 1 1 1 1 1 1 1
```

FIG. 2

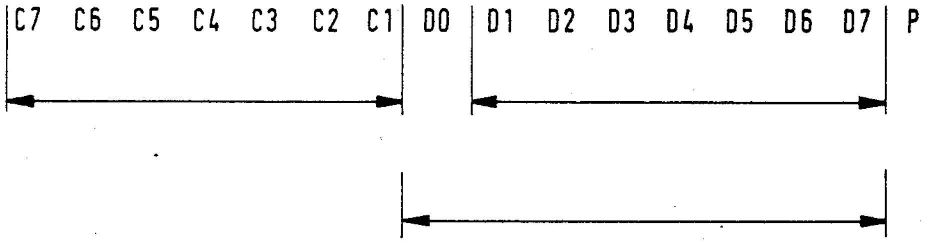

FIG. 3

$$C7 = D1 + D2 + D4 + D7 + (D1 + D5)(D2 + D3 + D4 + D6) + (D2 + D3)(D4 + D6) + D0$$

$$C6 = D7 + D1 + D3 + D6 + (D7 + D4)(D1 + D2 + D3 + D5) + (D1 + D2)(D3 + D5) + D0$$

$$C5 = D6 + D7 + D2 + D5 + (D6 + D3)(D7 + D1 + D2 + D4) + (D7 + D1)(D2 + D4) + D0$$

$$C4 = D5 + D6 + D1 + D4 + (D5 + D2)(D6 + D7 + D1 + D3) + (D6 + D7)(D1 + D3) + D0$$

$$C3 = D4 + D5 + D7 + D3 + (D4 + D1)(D5 + D6 + D7 + D2) + (D5 + D6)(D7 + D2) + D0$$

$$C2 = D3 + D4 + D6 + D2 + (D3 + D7)(D4 + D5 + D6 + D1) + (D4 + D5)(D6 + D1) + D0$$

$$C1 = D2 + D3 + D5 + D1 + (D2 + D6)(D3 + D4 + D5 + D7) + (D3 + D4)(D5 + D7) + D0$$

$(X)(Y) \Longrightarrow$ X AND Y $X + Y \Longrightarrow$ X Excl. OR Y

FIG. 4

REMOTE CONTROL SYSTEM FOR SELECTIVELY ACTIVATING AND INACTIVATING EQUIPMENT

BACKGROUND OF THE INVENTION

The invention concerns a remote control system for producing simple control operations, such as switching equipment on and off by means of a multiplicity of receivers, from a remote transmitter. The particular invention concerns the format of binary signal sequences transmitted with the receivers for selectively controlling one or more of them, each such sequence containing at least one control command, which includes an address for a single receiver, a group of receivers or all of them and control information for producing a controlled operation.

In such control systems, it is important to provide operation of the system that is to a very large extent free of interference of disturbance. This is particularly true in the case of commands transmitted by radio. It is particularly important to assure avoidance of producing an undesired initiation of false controlled operations by the wrong receiver or receivers as the result of disturbances or interference in the transmission path between transmitter and receiver. For this reason, error correcting codes with useful words and pseudowords are used for composing the control of messages. The useful words are distinguished by the use of a large number of binary places, which for maximum reliability is as large as possible, producing the so-called places-distance, the minimum of which is called the Hamming distance.

If the useful word radiated by the transmitter to the transmission path is disturbed, a pseudoword most commonly appears at the receivers. The receivers can thereby recognize the disturbance and remain inactive regarding the putative command to be performed. A large Hamming distance, however, means also an increased expense for decoding the control command at the receiver.

Publications hereby incorporated by reference:

1. (Regarding Nordstrom-Robinson coding.)
   F. J. Furrer
   Fehlerkorrigierende Block-Codierung Fuer Die Datenuebertragung
   Birkhaeuser-Verlag Basel, Seite 167 und Seite 243
2. (Regarding "Willard sequence")
   M. W. Willard
   Optimum Code Pattern for PCM Synchronization
   1962 National Telemetry Conference
   May 24, 1962 Washington, D.C. Vol. 1, Pages 1–9

SUMMARY OF THE INVENTION

It is an object of the present invention to provide a control system of the kind above-mentioned in which with relatively high security against disturbance, the decoding expense at the receiver for control commands is reduced for the necessary hardware and the decoding time required is also substantially reduced.

Briefly, the control command consists of at least eight data bits and seven check bits, the eight data bits are composed of seven address bits and the control bit which contains the control information, the seven check bits are constituted by means of a Nordstrom-Robinson coding of the eight data bits with use of the control bit as a bit that is not cyclically used, and the control information bit is located immediately following the seven check bits in the transmission sequence.

The control system of the invention has the advantage that quick decoding in receivers that are economical of hardware results. In every receiver, there are six different valid command possibilities to be decoded, namely the individual address, the group address, and the common address for all receivers with, in every case, two possible command data, "switch-on" and "switch-off". For the configuration of the control command in accordance with the invention in the control message only three patterns in all are necessary for recognizing the six command possibilities, one each for each of the above-mentioned addresses. In consequence of the control bit containing the binary control information that can take on only the values "0" and "1", the seven check bits determined according to Nordstrom-Robinson coding for a control message containing an address and the control information "switch-on", as compared with the seven check bits for a message containing the same address and the control information "switch off", are merely inverted. At there receiver, therefore, the same pattern can be used for recognizing both of the control commands containing opposite control information by inverting the check bits.

Each pattern requires only one register, one coincidence detector and a coincidence counter. At the beginning of every decoding there are written into the three registers, the individual address, the group address and the common address valid for all receivers, including the corresponding parity bit from the seven address bits. The control bits which number seven altogether are formed successively according to the Nordstrom-Robinson code and with the check bits, the incoming control message is checked for coincidence. The coincidence counter counts the number H of coincidence (corresponding bits identical). If the counter content H after eight comparisons of the control bits is less than four, the conclusion can already be drawn that only a command with inverted control information is permissible and that inverted control information will be found in the control bit that follows in the eighth position, and that therefore the sign was changed and the check bits must be inverted. This conclusion will be verified with the control bit following at the eighth place of the control command. The checking of the check bits in inverted form does not need to be repeated, since the count of the coincidences will merely be converted into non-coincidences and vice versa. The count H of the coincidences would then be less than four. The further decoding can proceed without interruption or restart and it must merely be taken into account that $H=n$ (where $n<4$) is now to be converted into $H=8-n$. In this manner, a substantially shorter decoding time is obtained for the received control command.

An advantageous embodiment of the control apparatus of the invention is provided when a Hamming distance of 5 is obtained with the Nordstrom-Robinson coding. This happens when the parity bit formed with respect to the seven address bits completes a sixteen bit word. The Hamming distance is increased by 1, from 5 to 6, by the parity bit.

A further advantage is obtained by sequencing first the seven check bits, then the control bit, then the seven address bits and finally, the parity bit. When this is done, the decoding can be carried out on line.

BRIEF DESCRIPTION OF THE DRAWINGS

The invention is further described by way of illustrative example preferenced to the annexed drawings, in which:

FIG. 2 shows the pattern or format of a control message broadcast by the transmitter of FIG. 1;

FIG. 3 is a schematic representation of how a control command is put together into a control message of the kind shown in FIG. 2;

FIG. 4 is a diagram of the Nordstrom-Robinson coding utilized for obtaining the check bits contained in the control command illustrated in FIG. 3

DESCRIPTION OF THE ILLUSTRATED EMBODIMENT

Figure 1:
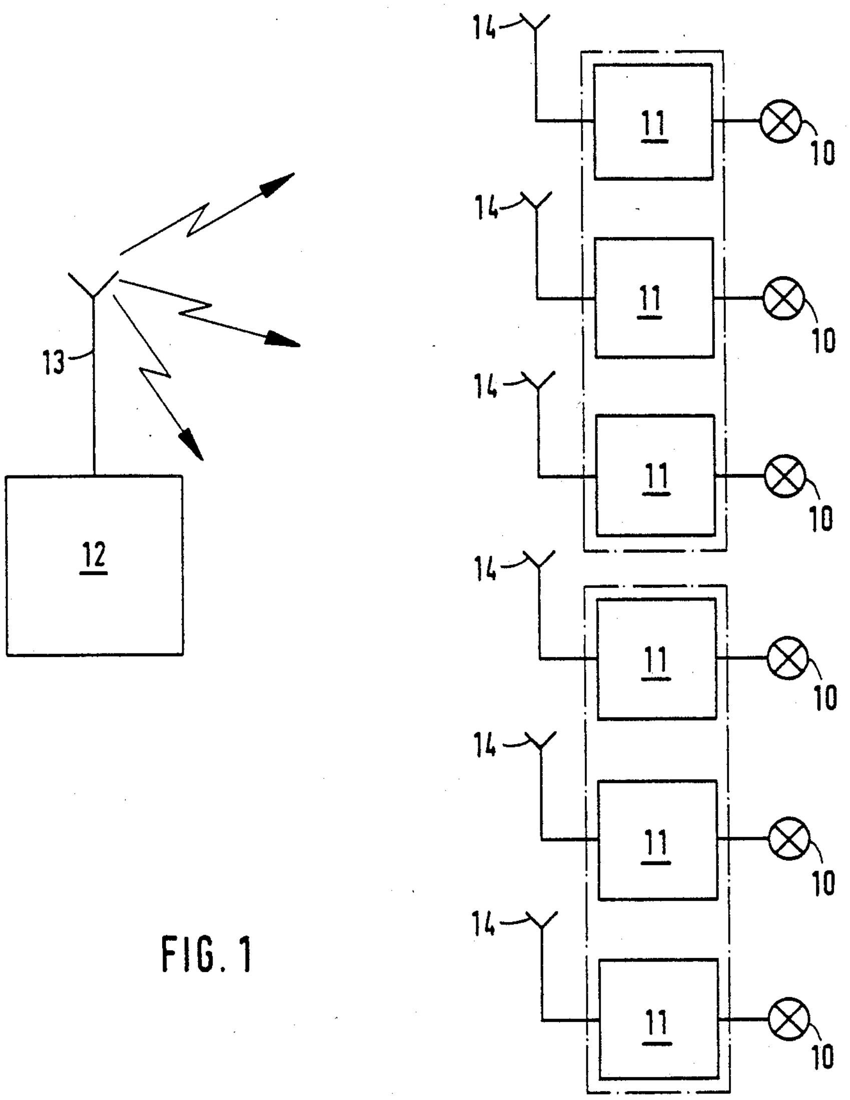
FIG. 1 is a block circuit diagram of a radio remote control system for switching remotely located apparatus on and off.

The highly schematic representation of a control system shown in FIG. 1 illustrates a system for remote switching on and off of appliances or other apparatus utilizing electric current from a central location far from the appliances and apparatus in question. The appliances or apparatus utilizing current are shown by a lamp symbol, for simplicity, which is designated 10. Each appliance 10 is associated with a receiver 11 which performs the switching on and switching-off of the appliance 10 in each case in response to a control command received by radio. The receivers 11 can be activated selectively from a transmitter 12 far from the receivers, in order to produce the required switching of the appliance 10 connected to the receiver. For this purpose, the transmitter 12 in each case sends out a control message over a transmitting antenna 13 and the control message is then picked up by the receiving antennas 14 of the receivers 11, then received and finally decoded.

The constitution of each transmission radiated by the transmitter is illustrated schematically in FIG. 2. It consists of a preammble of 32 bits, at least one control message and a coda or appendix. The preamble contains a word of zeros (the upper line in FIG. 2 and a word of Willard sequence (the second line in FIG. 2). The control message, like the two words just mentioned, is a sixteen bit word, the binary places of which are characterizied in FIG. 2 by the presence of the letter X (third line from above in FIG. 2). The coda consists of a word of ones.

The receivers 11 are selectively interrogated by the control message, either a single receiver 11, or a group of receivers 11, shown, for example in FIG. 1 by a chain-dotted frame, or the aggregate of all the receivers 11. According to whether a single receiver, a group less than all of them or all of the receivers, are to respond, there is contained in the control message, an individual address designating a single receiver 11, a group address designating a group of receivers or a common address designating all of the receivers, in accordance with a prescribed code. In addition, the control message, of course, contains the binary control information regarding the kind of controlled operation, namely switching on or switching off of the appliance 10, to be performed by a receiver 11, a group of receivers 11, or by all of the receivers 11.

The composition of the control message is schematically illustrated in FIG. 3. The message part of the transmission has eight data bits D 0–D 7 and seven check bits C 1–C 7. The data bits D 0–D 7 are composed of seven address bits D 1–D 7 and one control bit D 0 containing the binary control information, the so-called "sign". Furthermore, another bit, the parity bit P, is formed from the address bits D 1–D 7 and provides the sixteenth bit which completes the word of the control command. In the order of transmission, the seven check bits C 7–C 1 come first, in that order, then comes the control bit D 0 , then the address bits D 7–D 1 and, finally, the parity bit D.

The seven check bits C 7–C 1 are provided in accordance with a Nordstrom-Robinson coding, the scheme of which is given in detail in FIG. 4, by which they can be determined by the eight data bits D 0–D 7. In this scheme, the seven address bits D 7–D 1 rotate cyclically and the control bit D 0 is used as a bit that is not cyclically used. The first four address bits in the transmitting sequence, namely the address bit D 7–D 4 contain individual addresses and the next three, the address bits D 3–D 1 contain group addresses for the receivers 11, excepting however, the individual address 0000 and the group addresses 111 and 000. The common address to which all the participating receivers respond is 0000111. The various groups of receivers constituted of less than all of them have addresses 0000abc, where abc represent any combination of ones and zeroes containing at least one 1 and at least one 0. Individual receivers of any of the groups abc are called into action by an address defg abc where, again, the letter designations relate to bits that may be either a 1 or a 0. Each of these receivers, when addressed, receives a switch-on or switch-off order according to the value 0 or 1 of the control bit D 0.

An example of a complete control message which in this case orders all receivers to produce a switch-off of the controlled apparatus, in accordance to the above-described rules, is as follows:

01000010 00001111.

The control message addressed to all receivers for producing a switch-on operation has the following appearance:

10111101 00001111.

Six different valid messages need to be decoded in the various receivers 11, namely, a command to all receivers, a command to a group of receivers and a command to a single receiver with, in each case, two possibilities of the sign of the command. By the Nordstrom-Robinson coding and the sequence of the sixteen bits in which the sign of the command inverts the first eight bits of every message, the receivers need to recognize only three different patterns in the input sequence of the control messages. After the eighth bit, it will already be decided for every address what command sign is in question. For decoding, including the establishment of the pattern, three registers of eight bits each are provided in each receiver 11. In these three registers there can be written in the three different addresses of the receiver, namely, the common address (0000111), the group address (0000 abc) and the individual address (defg abc), as well as the parity bit P belonging thereto. The addresses are permanently stored, e.g. "hard wired", in the receiver, in configurations specific to the particular receiver. By means of Nordstrom-Robinson coding (FIG. 4) there are derived from the first seven bits of the stored addresses the check bits C 7–C 1. The registers can be loaded alternately with stored address bits and stored bits. First, each check bit is compared in a parity check device with a bit of the same kind of the incoming control message. The result of the comparison is supplied to a parity counter which counts the number H of the coincidences. When H is less than 4, the conclusion is reached that only the command with the other sign remains in question.

After the processing of the first eight bits, the registers are loaded with the respective three addresses, including the parity bit. Then the contents are compared bit by bit with the seven address bits and the parity bit of the incoming command control, and again the coincidences of corresponding bits is examined. The presence of fourteen of the sixteen possible coincidences produces recognition of a valid command, regardless which of the sixteen bits is disturbed.

The invention is not limited to the illustrative example described. Thus, with an individual address defg abc, there can be called into play not merely an individual receiver, but instead a number of receivers simultaneously. Also, in the case of calculation of the check bits C 7–C 1 according to the Nordstrom-Robinson code (FIG. 4), the sequence of the address bits D 1–D 7 (FIG. 3) can be changed, so that the address bit D 1 is immediately adjacent to the parity bit and the address bit D 7 next to the control bit D 0.

The concepts of the Nordstrom-Robinson coding and of the Willard sequence here used, are concepts explained in publications well known in the art, reference to which is made for further details thereof.

In FIG. 4, where the obtaining of the check bits from the address bits by Nordstrom-Robinson coding is shown, it is noted at the bottom of FIG. 4 that in the seven lines showing of the seven check bits are obtained, the plus sign designates an exclusive-OR correlation and the use of parenthesis in the manner common for indicating the product of multiplication represents an AND correlation.

Figure 5:
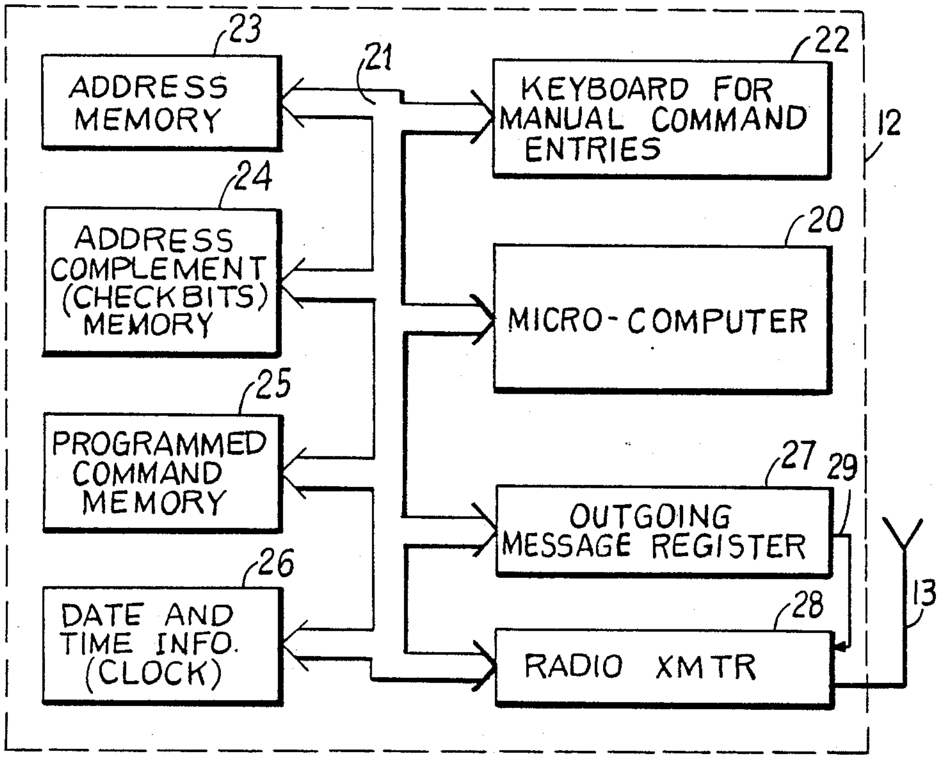
FIGS. 5 and 6 are block circuit diagrams respectively of the transmitter and of a receiver of the system of the invention.
Figure 6:
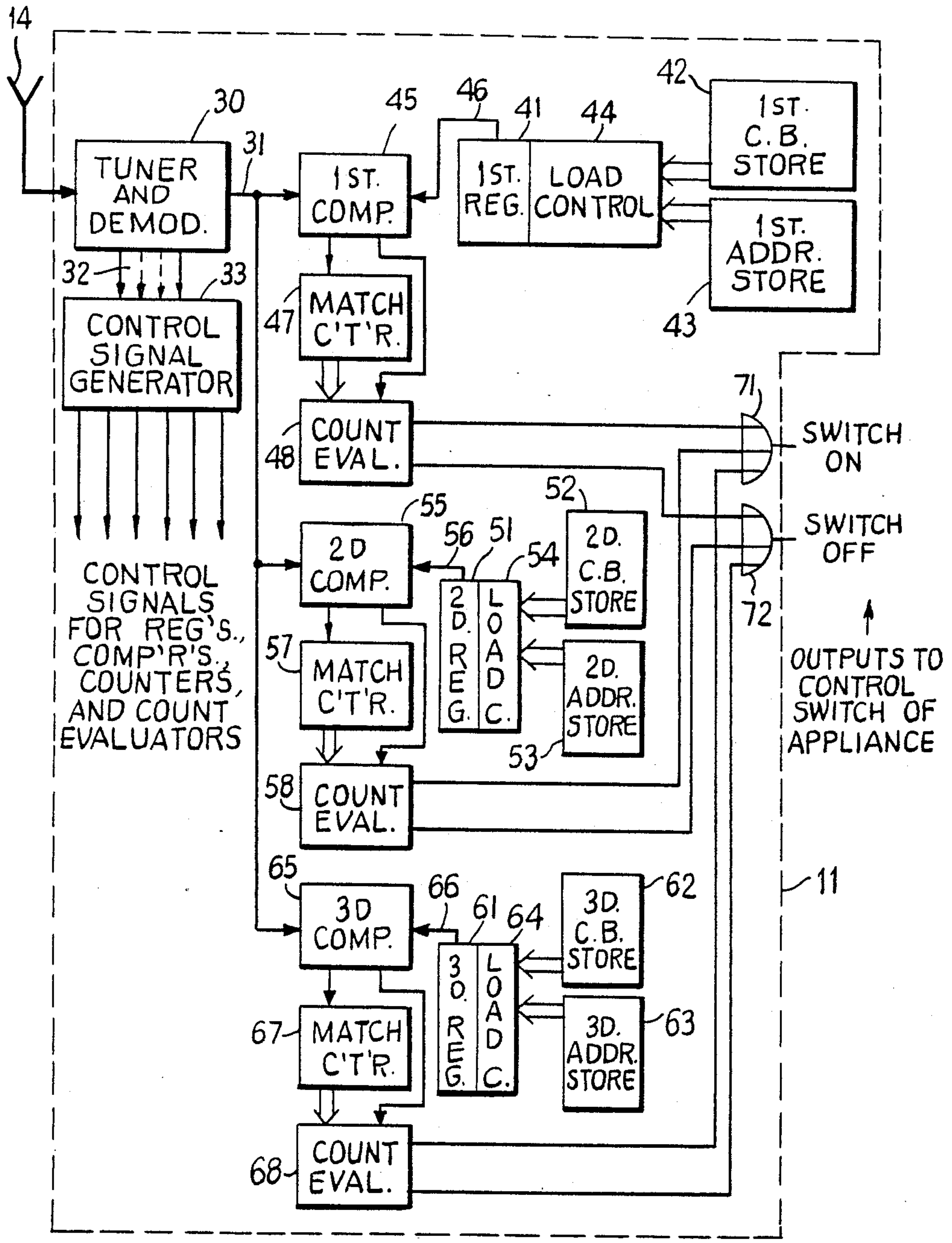

FIGS. 5 and 6 show the organization of a transmitter 12 and a receiver 11 for carrying out respectively the sending and receiving of messages above-described with respect to FIGS. 2, 3 and 4.

The transmitter has microcomputer 20 connected through a multibit bus means 21 with a keyboard 22 for manual command entries, an address memory 23 containing all the addresses that may need to be used in control messages, an address complement memory for the sets of check bits that go with the various addresses, a programmed command memory for storing commands planned in advance and stored for later sending to the receivers and a data and time information unit 26 for making available current data and time information for use in sending out previously planned control messages. The microcomputer also is connected through the bus means 21 with an outgoing message register 27 and also to the radio transmitter 28. The outgoing message register 27 includes a portion not separately shown for storing the preamble and coda associated with the messages, as well as the messages put together from the address and check bit memories with the addition of a control bit and a parity bit as already described, and a serial output 29 is shown for the register 27 to indicate that the radio transmitter sends the properly constituted and sequenced message in serial binary digit form.

It should be noted that it is just as economical to store the sets of check bits in memory in the same manner as the addresses themselves, so that it is not necessary to code the check bits as addresses are used in the transmitter. This principle is even more applicable to the receiver shown in FIG. 6 where only three addresses are stored, as already explained.

As shown in FIG. 6, the receiver includes a tuner and demodulator unit 30 and has a message output 31 and a group of control outputs 32, the latter leading to a control signal generator 33 for producing the control signals for the registers, comparators, counters and count evaluators which are used to process the message output. For that processing, as already explained, only three 8 bit registers are required, and these are the first register 41, the second register 51, and the third register 61 shown in FIG. 6. As already explained, these registers must be loaded first with a set of check bits and then with a set of address bits for processing every message. There are, therefore, provided first, second and third check bit stores (or memories) 42, 52 and 62, and likewise first, second and third address stores 43, 53 and 63. For appropriately loading the registers, a set of loading gates, which may be referred to as a load control unit, is need for each register, these being shown respectively at 44, 54 and 64. The message output 31 of the tuner and demodulator goes in parallel to first, second and third comparators 45, 44 and 65, where the check bits are sequentially compared with the corresponding registers after the latter are loaded with stored check bits. The address and parity bits are thereafter compared with the stored address and parity bits. For these purposes, a serial output is shown going from each register to the corresponding comparator, respectively at 46, 56 and 66. The control signal generator 33, of course, provides control signals for loading the check bits and the address bits in the registers at the correct time when a message is being received, and for stepping out the serial output of the registers as the message bits are put into the comparators.

As already explained, the comparators have an output showing whether or not the stored and received bits which are compared match each other or not, and that output goes to a match counter which counts the number of matches found. The match counters are shown respectively at 47, 57 and 67. At the end of the check bits comes the command or control bit. The eighth place of the check bit stores 42, 52 and 62, contains a bit representing a predetermined one of the two possible control commands. As already explained, by the time the control bit is decoded, the count evalution circuits 48, 58 and 68 have already determined from the output of the match counters which of the two opposite commands could still validly be received, so that the count evaluators can then determine from the control bit comparison supplied by the outputs supplied directly to the count evaluators whether there is a confirming match or another mismatch.

As already explained, the comparison of the address bits and the parity bit produces additional matches of compared bits wherever an apparently valid order has already been decoded from the check bits and control bit and gives a measure of the probability of error in the message, so that if the latter is great enough, the putative command will not be transmitted by the count evaluator in question to one of the OR gates 71 or 72 for controlling this switching of an appliance connected to the receiver.

Although the invention is described with reference to a particular illustrative example, it will be recognized that variations and modifications are possible within the inventive concept.

I claim:

1. Remote control system for selectively controlling switching on and switching off of electrical circuits by a transmitter at a location distant from the locations of a plurality of receivers each associated with an electric circuit which is to be switched on and off, said transmitter being equipped to broadcast to said receivers, and said receivers being equipped to receive control messages each consisting of binary digital signals and containing a control command and an address for selecting at least one of said receivers for response to said control command, and further comprising:

means at said transmitter for incorporating in each control message eight data bits comprising seven addsress bits (D1–D7) and one control bit (D0) and seven check bits (C1–C7), said seven check bits being derived from said eight data bits by a Nordstrom-Robinson code utilizing said control bit non-cyclically in coding while said address bits are used cyclically, whereby all said check bits are inverted for transmission with a predetermined sign of said control bit, and for transmitting said check bits one immediately after another and said control bit immediately after said check bits, and means at each of said receivers including three registers, each for comparing incoming data bits with sets of data bits respectively designating three different addresses to which the receiver is to respond, one for individual response, one for response in a group composed of less than all said receivers and one for response in the group composed of all said receivers, and for also comparing received check bits with check bits relating to the addresses served by the register, said receivers also containing means for determining the number of bit identities in comparisons of a set of seven check bits and for determining the number of bit identities in comparison of a set of seven address bits, and for thereby determining whether said receiver is selected for response and which of two opposite possible commands is to be performed.

2. Remote control system according to claim 1, in which said means at said transmitter for incorporating data and check bits in each control message includes means for also incorporating said message a parity bit (P) formed from from said seven address bits and transmitted immediately after the transmission of the last address bit, whereby each message, exclusive of any preceding or succeeding portion that may be supplemented thereto, may be transmitted as a sixteen bit word, and in which said registers in said receivers are eight bit registers connected for comparison with received data for first comparing seven check bits followed by a control bit and then comparing seven address bits followed by a parity bit, and in which said transmitter is constituted for transmitting said sixteen bit word by first transmitting said seven check bits (C 7–C 1) followed by said control bit (D 0) and then transmitting said seven address bits (D 1–D 7) followed by said parity bit (D).

3. Remote control system according to claim 2, in which said means in said receivers for determining number of bit identities and thereby determining whether said receiver is selected for response, include means for recognizing the greater probabilisty of recseiving an inverse set of check bits corresponding to the receiver address followed by said predetermined sign of said control bit.

4. Remote control system according to claim 1, in which said seven address bits comprise a sequence of four bits designating in one combination, that a plurality of receivers are being addressed and designating in all other combinations an individual receiver and three additional bits designating in one combination the group of all receivers and in all other combinations a group of less than all receivers to which at least one selected receiver belongs.

5. Remote control system according to claim 4, in which the address 0000 111 designates all receivers.

6. Remote control system according to claim 5, in which the address 0000 abc, in which abc stands for a combination of the digits 0 and 1 containing at least one 1, and at least one 0, designates all of the receivers belonging to the group designated by the digits constituting the particular binary digit combination designated by abc.

7. Method of remotely controlling switching on and off of electrical circuits respectively connected to receivers at a plurality of locations from a transmitter at a location distant from the location of said receivers, comprising the steps of:

producing transmissions at said transmitter, each including a message containding eight data bits comprising seven address bits and one control bit and also seven check bits, including the substep of deriving said seven check bits from said eight data bits by a Nordstrom-Robinson code utilizing said control bit non-cyclically in coding said check bits while said address bits are used cyclically in coding said check bits, the transmitting being performed in a manner transmitting said check bits one immediately after another and said control bit immediately after said check bits:

receiving said messages at each of said receivers;

comparing the sequence of eight bits made up of said check bits and said control bits at each said receiver with check bits corresponding to the address of the particular receiver and a predetermined sign of said control bit, by counting the number of identities of corresponding bits, with recognition of the inverse of the check bits as providing identities in the case of the reception of a control bit of sign opposite to said predetermined sign and comparing said address bits with address bits of said message by counting the number of identities of corresponding bits for determining whether or not more than a tolerable number of transmission errors have occurred for response to the message and address receiver.

8. Method according to claim 7, in which in transmitting each message the check bits followed by said control bit are transmitted first, said address bits follow immediately thereafter and a parity bit derived from said address bits is transmitted immediately after said address bits.

* * * * *